(12) United States Patent
Simpson et al.

(10) Patent No.: US 6,634,973 B1
(45) Date of Patent: Oct. 21, 2003

(54) HYDRAULIC TENSIONER WITH TWO SPRING BIASED PISTONS AND CUSHIONED PULL-BACK RACK

(75) Inventors: Roger T. Simpson, Ithaca, NY (US); Braman Wing, Thompkins, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/540,155

(22) Filed: Mar. 31, 2000

(51) Int. Cl.[7] ................................................. F16H 7/22
(52) U.S. Cl. ........................................ 474/109; 474/140
(58) Field of Search ................................. 474/101, 109, 474/110, 111, 112, 133, 134, 135, 136, 137, 138, 140

(56) References Cited

U.S. PATENT DOCUMENTS

| | | | |
|---|---|---|---|
| 4,822,320 A | 4/1989 | Suzuki | 474/111 |
| 4,874,352 A | 10/1989 | Suzuki | 474/110 |
| 5,073,150 A | 12/1991 | Shimaya | 474/110 |
| 5,167,402 A | 12/1992 | Nakakubo et al. | 267/226 |
| 5,304,099 A | 4/1994 | Deppe et al. | 474/102 |
| 5,346,436 A | 9/1994 | Hunter et al. | 474/110 |
| 5,352,159 A | 10/1994 | Suzuki et al. | 474/110 |
| 5,383,813 A | 1/1995 | Odai | 474/110 |
| 5,637,047 A | 6/1997 | Schulze | 474/110 |
| 5,913,742 A * | 6/1999 | Nakamura et al. | 474/110 |
| 5,993,342 A | 11/1999 | Wigsten et al. | 474/110 |
| 6,234,928 B1 * | 5/2001 | Suzuki et al. | 474/109 |

* cited by examiner

Primary Examiner—Thomas R. Hannon
Assistant Examiner—Vicky A. Johnson
(74) Attorney, Agent, or Firm—Fitch, Even, Tabin & Flannery; Greg Dziegielewski

(57) ABSTRACT

A hydraulic rack-style tensioner includes two concentric pistons in the bore of a tensioner housing. The lower piston which occupies a generally lower position in the housing has conventional ratchet teeth on an outside surface. The ratchet teeth form a rack which are engaged by a pawl. An upper piston occupies a generally upper protruding position in the housing. A chamber is defined between the upper piston and the housing, or between the upper piston and lower piston. Pressurized fluid in the chamber between the upper and lower pistons act to cushion impact of the rack and pawl mechanism when high loads from an associated tensioner arm and chain cause the upper and the lower pistons to be forced back toward the tensioner housing.

13 Claims, 3 Drawing Sheets

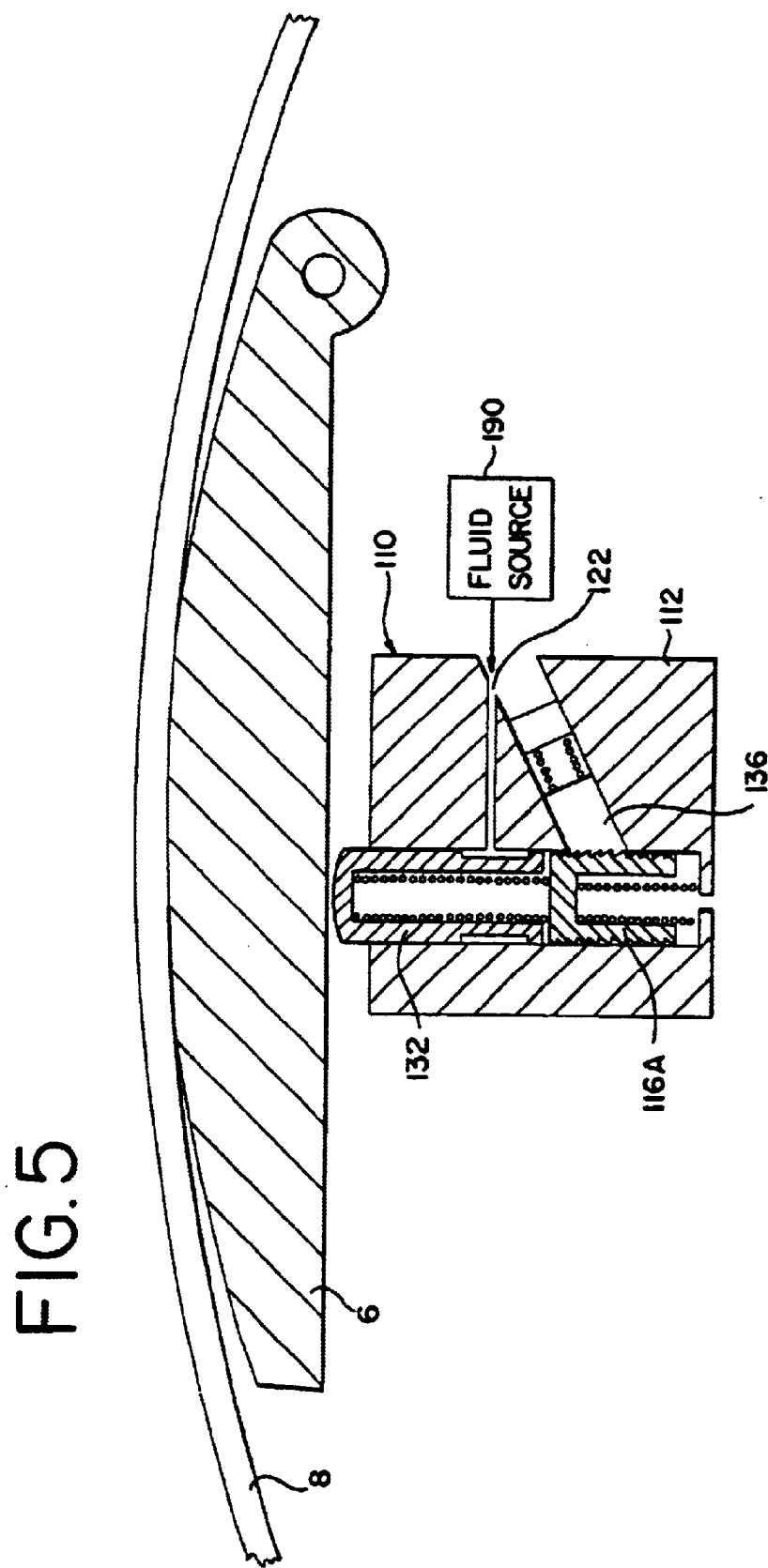

HYDRAULIC TENSIONER WITH TWO
SPRING BIASED PISTONS AND CUSHIONED
PULL-BACK RACK

BACKGROUND OF THE INVENTION

The present invention relates generally to a hydraulic chain tensioner having a lower piston and an upper piston, both longitudinally movable in a housing. The present invention has particular application to a cushioned stop mechanism for such a tensioner.

Tensioning devices, such as hydraulic tensioners, are used as control devices for power transmission chains as a chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or unmeshing of the chain with the sprocket teeth. It is especially important in the case of a chain-driven camshaft in an internal combustion engine to prevent the chain from slipping because the camshaft timing can be misaligned by several degrees, possibly rendering the engine inoperative or causing damage.

In a typical hydraulic tensioning device with a ball-type check valve, fluid flows from a pressurized fluid source through a clearance formed between the ball and the seat of a check valve. The hydraulic pressure from an external source, such as an oil pump or the like, flows into a chamber through passages formed in the housing, easily moving the piston outward by the combined efforts of the hydraulic pressure and the spring force.

On the other hand, when the piston tends to move in a reverse direction, the ball of the check valve is tightly contacted with the ball seat to restrict the flow of fluid from the chamber, thereby preventing retraction of the piston. In this manner, the tensioner achieves a so-called no-return function, i.e., are easy in one direction (outward) but difficult in the reverse direction (inward).

A potential problem with hydraulic tensioners of this construction, however, is that they may not always maintain a predetermined tension, especially when an engine is being started or idling at rest with little or no oil pressure. Unless appropriate oil pressure is applied to the chamber, or the chamber is filled with a sufficient amount of oil, the piston moves easily in both directions and loses the no-return function, resulting in noises and vibrations in the chain and associated mechanisms during start-up conditions.

A solution to this potential problem is to provide the tensioner with a rack and ratchet assembly to act as a mechanical no-return device. U.S. Pat. No. 5,346,436 to Hunter et al., which is owned by the assignee of the present application and which is incorporated herein by reference, discloses a rack and ratchet assembly that provides a mechanical no-return function. A drawback of such rack and ratchet assemblies is the device usually has a certain amount of backlash, or backward movement, causing the tensioner piston to impact it during normal operation. This can cause excessive wear on the rack assembly. In addition, as engine speed and oil pressure rise, the tensioner can advance too far, over tensioning the chain and causing excessive noise or premature chain failure.

Another example of a tensioner with a ratchet mechanism is shown in Shimaya, U.S. Pat. No. 5,073,150. In Shimaya, a hydraulic tensioner is described which has uses a ratchet with a plunger to prevent excessive slackening of a chain following sudden increases in chain tension. A chamber is formed between the top of the plunger and the tensioner fixed housing. Increasing fluid pressure in the chamber decreases the force applied by the tensioner plunger to the chain. In other words, fluid pressure in the chamber is used to apply a force to the tensioner which opposes the force tending to apply tension to the chain. In all embodiments, the ratchet acts on the plunger thereby preventing retraction of the plunger into the bore of the housing.

The present invention uses engine oil pressure in a hydraulic rack tensioner to reduce impact loading and associated wear. In particular, the tensioner of the present invention includes an lower piston and an upper piston. A pawl or ratchet engages a rack formed on the lower piston when chain tension causes the upper piston to be forced downward toward the lower piston. A fluid chamber formed between the upper and lower pistons provides a fluid cushion to reduce the impact of the pawl and the rack. When the engine is producing little or no pressurized fluid, such as when the engine is idling or turned off, the piston spring acts on the lower piston and causes the rack to be advanced to the next extended setting.

SUMMARY OF THE INVENTION

In accordance with one embodiment of this invention, a hydraulic rack-style tensioner includes two concentric pistons in the bore of a tensioner housing. A first piston which occupies a generally lower position in the housing (and may also be referred to as the first, outer or lower piston) has conventional ratchet teeth on an outside surface forming a rack. The ratchet teeth formed around the circumference of the lower portion of the outside wall of the lower piston, but may be formed on one side of the piston. In this case, the tensioner and/or piston must be designed to prevent rotation in the bore.

The rack teeth are engaged by a pawl. The pawl is held against the first piston by a spring, so that as the lower piston extends, the pawl will prevent it from moving back. The lower piston is spring loaded so that the piston naturally tends to advance to the next ratchet setting.

A lower chamber is formed between the hollow lower portion of the lower piston and the bore of the housing. In this embodiment, the lower chamber is not supplied with pressurized fluid. A vent is provided in the housing opening into the lower chamber which allows air and oil to enter and exit the lower chamber unimpeded.

The lower piston has a section of reduced diameter, or a narrow waist section along the midsection of the piston, and pressurized oil is fed into the cavity between the outside of the piston and the bore of the housing. The cavity is formed on the lower piston on a side generally opposite the rack. In an alternate embodiment, the cavity may extend around the circumference of the lower piston generally above the rack portion of the piston. Oil is then fed from the cavity into a second or fluid chamber formed between the lower and an upper or second piston, the upper piston being located in a piston bore formed in an upper section of the lower piston. The oil pressure in the fluid chamber causes the two pistons to be forced apart.

The pressurized fluid forces the upper piston against the tensioner arm which is in turn contacts an associated chain. While the lower piston is biased in an outward direction by a piston spring in the lower chamber, the upper piston in this embodiment does not have a piston spring associated therewith. Movement of the upper piston in the outward direction is caused by the lower piston contacting the upper piston directly and/or pressurized fluid in the fluid chamber. The force of the chain tension on the tensioner arm, and thus on the upper and lower piston, forces the pistons back toward the tensioner when the chain force exceeds the force of the piston spring and the fluid pressure on the upper and lower pistons and causes engagement of the rack on the lower piston against the pawl. The oil pressure additionally provides a cushioning and damping effect, reducing the loads on the pawl.

A second embodiment is similar to the first embodiment with the main difference being a rack portion of the lower piston being formed about the entire circumference of the lower portion of the lower piston. Above the lower portion of the lower piston a narrow cross section of the lower piston forms a cavity with the bore of the housing which extends about the entire circumference of the lower piston.

A third embodiment uses two separate pistons stacked axially in the same bore. Functionally, this is similar to the concentric piston design. In this embodiment, a hollow lower piston is slidably received in a bore formed in the tensioner housing. The hollow portion of the lower piston forms a lower chamber with the tensioner housing. The lower chamber is vented to atmosphere. A hollow upper piston is slidably received in the same bore of the housing directly above the lower piston. In contrast to the first embodiment, both the lower and upper pistons have a piston spring which act to bias each respective piston in a protruding direction from the bore of the housing.

The upper piston in the stacked piston embodiment has a narrow waist or midsection which forms a cavity or passage between the bore of the housing and the outside of the upper piston. A opening in the midsection of the upper piston adjacent the cavity permits pressurized oil to enter a fluid chamber formed by the hollow upper piston and the top of the lower piston. The pressurized oil in the fluid chamber acts to push the upper piston in a protruding direction and the rack of the lower piston downwardly against the pawl and provides a fluid cushion between the upper and lower piston.

For a further understanding of the present invention and the objects thereof, attention is directed to the drawing and the following brief description thereof, to the detailed description of the preferred embodiment of the invention and to the appended claims.

BRIEF DESCRIPTION OF THE DRAWINGS

FIG. 5 is a sectional view of the tensioner of FIG. 3 applied to a tensioner arm and chain.

DETAILED DESCRIPTION OF THE PREFERRED EMBODIMENTS

Figure 1:
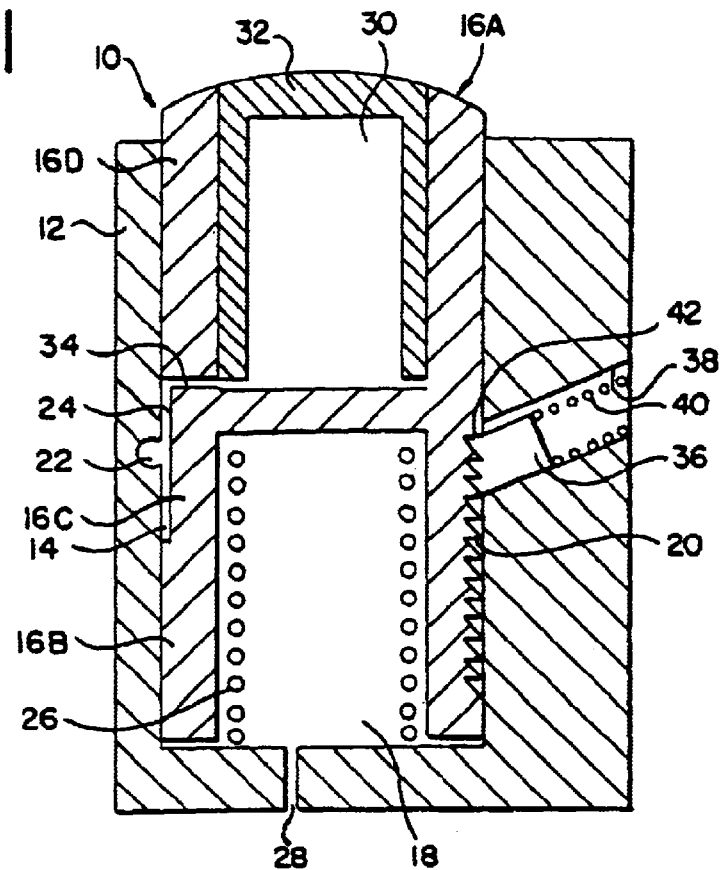
FIG. 1 is a sectional view through the middle axis of a hydraulic tensioner of the present invention.

Turning now to the drawings, FIG. 1 illustrates a preferred embodiment of the hydraulic chain tensioner incorporating the lower and upper piston arrangement of the present invention. The tensioner 10 includes a housing 12 having a bore 14 formed therein. Preferably, the bore 14 is cylindrical. The bore 14 slidably receives a hollow plunger or lower piston 16A, also preferably cylindrical. An interior space located in a lower portion 16B of the lower piston 16A in combination with the housing 12 provides an open chamber 18. Air and fluid may enter and exits the open chamber 18 through vent or inlet 28. The operation of the tensioner of the present invention does not require a one-way check valve to be inserted into the vent 28 as in a conventional fluid tensioner to provide a one-way fluid supply for adding pressurized fluid to the open chamber 18.

A spring 26 in the chamber 18 contacts an inside surface of the lower piston to bias the lower piston in a protruding or outward direction. The lower piston 16A has an outside surface with a narrow section 16C on one side and ratchet teeth or grooves 20 forming a rack section on another side. Alternately, the ratchet teeth are formed around the circumference of the lower piston. The teeth formed on the pawl engaged with the rack prevent the piston from rotating in the bore and thus, prevents misalignment of the piston.

A fluid passageway 22 in the housing 12 supplies pressurized oil form a pressure fluid source (shown in FIG. 5 as element 190) to a cavity 24 formed between the housing 12 and the narrow section 16C of the lower piston 16A. The pressure fluid source may be an oil pump, a reservoir or the like. The enclosed area of the upper end of the lower piston and a hollow interior of the upper piston 32, when the upper piston is slidably received in the upper portion 16D of the lower piston, forms fluid chamber 30. An opening 34 formed in the lower piston 16A provides a fluid connection between the cavity 24 and the fluid chamber 30 formed between the lower and upper pistons. Thus, when pressurized fluid enters and fills the fluid chamber 30 it acts to force the upper piston 32 in a protruding direction from the tensioner housing 12.

It will be appreciated that the upper piston 32 may incorporate an oil vent aperture, vent disc or the like at its upper end to control the venting of passage of fluids, excess oil and trapped air as taught by the prior art. However, in order for the fluid chamber 30 to provide a cushioning effect between the lower piston 16A and the upper piston 32 fluid must be able to freely enter and exit the fluid chamber because if the fluid is blocked in the fluid chamber 30 by a check valve, for example, forces acting on the upper piston 32 would be fully transmitted to the lower piston 16A and thus, the rack and pawl mechanism. It should be understood that the fluid passage system to provide pressurized fluid to the second fluid chamber 30 is any fluid passage system including a combination of passageways, openings, reservoirs or the like which operate to provide pressurized fluid to the fluid chamber 30 between the lower and upper pistons.

A pawl 36 is disposed in a side bore 38 in the housing 12. A pawl spring 40 biases the pawl 36 against the side of the lower piston 16A. Teeth 42 on the pawl 36 engage the grooves 20 on the outside surface of the lower piston 16A in such a direction to allow the lower piston 16A to advance from the housing bore 14 in a protruding direction and prevent the return of the lower piston 16A into the housing 12. This provides the mechanical no-return function. Other no-return rack and ratchet mechanisms are contemplated as well.

During start-up of the tensioner, building fluid pressure causes fluid to enter through inlet 34 and fills pressurized chamber 30. As the chamber fills with fluid, the lower piston 16A and upper piston 32 are forced apart. The lower piston 16A tends to be forced back into the housing 12 against the biasing force of the spring 26 and the grooves 20 engages the teeth of the pawl 36 essentially preventing the lower piston to travel farther inwardly. The upper piston 32 moves apart from and outward with respect to the lower piston 16A and transmits an outward force to an associated tensioner arm and chain.

During operation of the engine, piston 16A and piston 32 must have some limited travel inward and outward from the bore as the engine speed increases from idle to maximum speed and back. In part, the distance the piston 16A may travel back and forth in the bore is a function of the pitch of the rack 20 teeth or grooves and the space in which the pawl 36 is allowed to move in the bore 38. In other words, when the force generated by the chain and fluid in the chamber 30 are greater than the force of the spring 26, the lower piston 16A moves downwardly into the bore. The pawl engages the rack and stops the movement of the piston 16A. When the downward force lessens, the lower piston 16A may move up slightly due to the play of the pawl 36 in the bore 38. Less force on the lower piston 16A allows the lower piston to travel farther from the bore and the rack moves past the pawl to the next ratchet setting.

The motion of fluid in and out of chamber 30 allows some relative motion between upper piston 32 and lower piston 16A. When oil pressure decreases, the chain tension forces the upper piston 32 inward into contact with the lower piston 16A. As the upper piston 32 travels inwardly the fluid in the chamber 30 exits the chamber gradually and prevents a sudden retraction and lessens the impact of the upper piston 32 on the lower piston 16A. As a result of the rack and ratchet system, when the upper piston 32 contacts the lower piston, the teeth 42 of the pawl 36 engage with the rack 20 on the lower piston 16A preventing both pistons from retracting inwardly. Thus, the lower piston 16A remains in its last most outward setting or position due to the cooperation of the rack and the pawl. Due to the gradual retraction of the upper piston, engagement of the rack and pawl are cushioned and a sudden shock to the rack and pawl are prevented.

Figure 2:
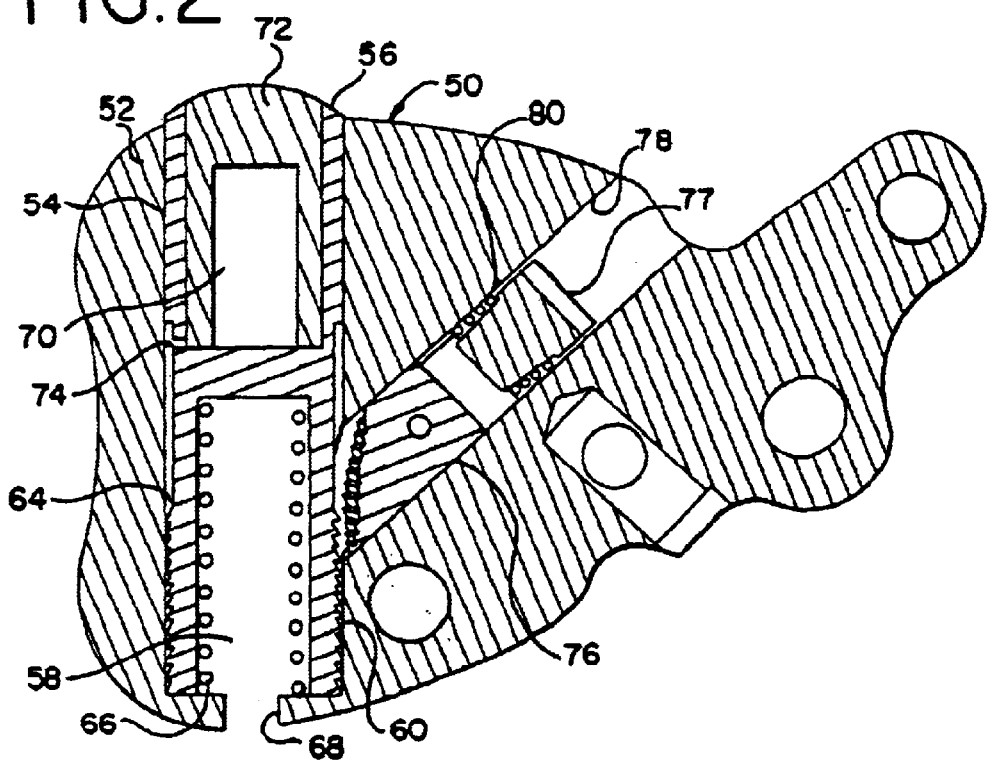
FIG. 2 is a sectional view of a second embodiment of the present invention with a circumferential rack portion and a circumferential cavity.

FIG. 2 illustrates an alternate embodiment of the tensioner shown in FIG. 1. In particular, tensioner 50 includes a housing 52 which contains an upper piston 72 and a lower piston 56 in a cylindrical bore 54 formed in the housing. The lower piston 56 has a hollow lower portion which forms a chamber 58 with the bore 54. Air and fluid passes in and out of the chamber 58 freely through vent 68. The lower piston 56 is biased in an outward direction by a piston spring 66. The lower piston 56 has a series of circumferential grooves or teeth about the lower portion of the piston 56 forming a rack 60. Pawl 76 is held in a bore 78 of the housing 52. The pawl 76 is biased against the rack 60 by a spring 80. The spring 80 is positioned between the pawl 76 and a plug 77 which is fit into the bore 78 after insertion of the pawl and the spring. At the piston 56 midsection, a narrow cross-section of the piston, which extends about the entire circumference of the piston, creates a cavity 64 between the piston and the bore 54. A passage (not shown, but similar to the passage 22 in FIG. 1) in the housing supplies pressurized fluid to the cavity 64.

The upper piston 72 is slidably received in a hollow upper portion of the lower piston 56 and forms a chamber 70 therebetween which is supplied pressurized fluid from cavity 64 by passageway 74.

Functionally, the tensioner of FIGS. 1 and 2 are the same. The main structural difference lies in the circumferential grooves which form the rack 60 in FIG. 2 and the cavity 64 which also extends about the entire circumference of the piston 56. In the embodiment of the tensioner shown in FIG. 2, the piston 56 is free to rotate in the bore while the lower piston in the tensioner of FIG. I is constrained from rotating.

Figure 3:
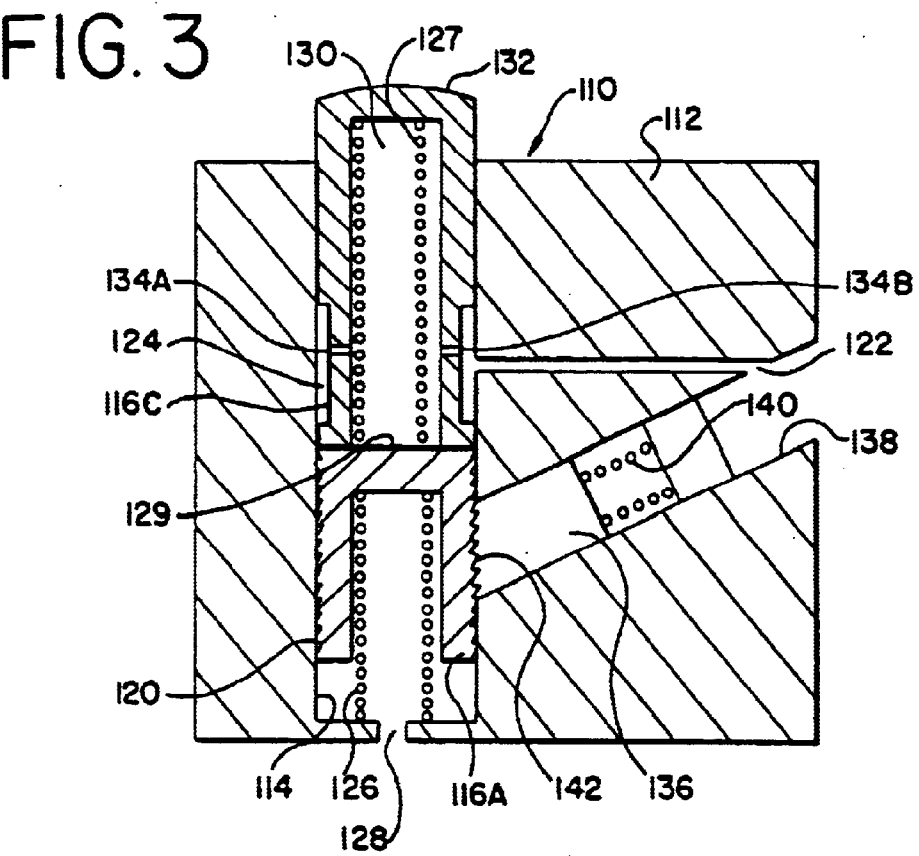
FIG. 3 is a sectional view of a third embodiment of the present invention showing the effect of applied oil pressure on the tensioner.
Figure 4:
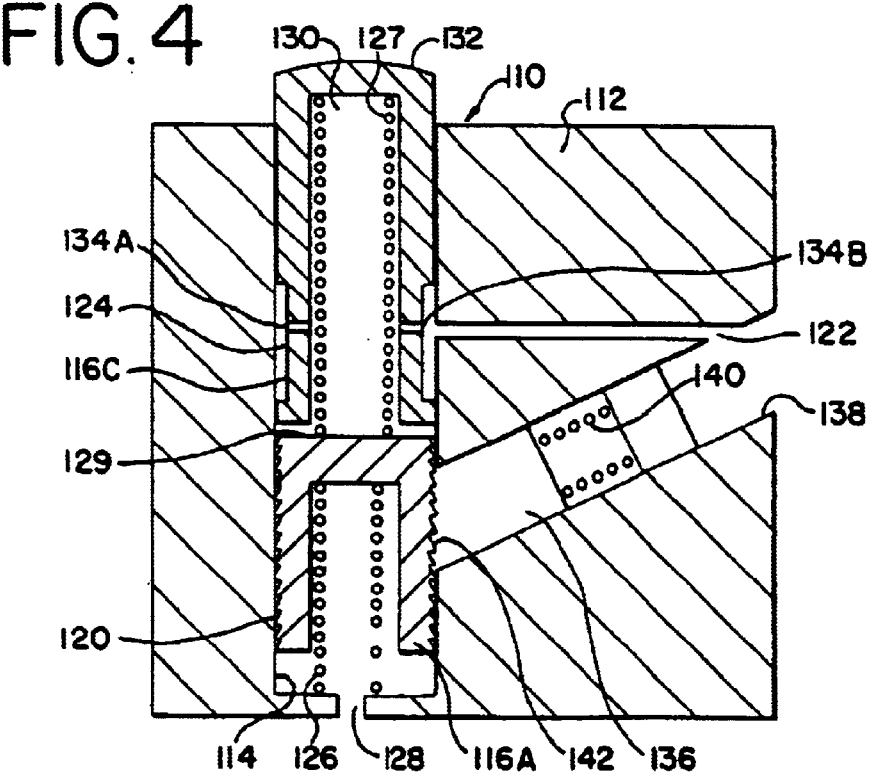
FIG. 4 is a sectional view of the tensioner of FIG. 3 showing the effect of reduced of oil pressure on the tensioner.

FIGS. 3–4 illustrate a second embodiment of the tensioner 110 of the present invention during low and high oil pressure periods respectively. In this embodiment, the tensioner housing 112 includes a bore 114. A first or lower piston 116A, which is preferably cylindrical, is slidably disposed in the bore 114. A first piston spring 126 disposed between the housing 112 and the lower piston 116A acts to bias the piston 116A in a protruding direction. The lower piston also 116A includes a series of circumferential grooves 120. A pawl 136 disposed in a bore 138 in the housing 112 is held biased against the grooves or rack 120 by a spring 140 and prevents the downward return of the lower piston 116A.

An upper piston 132 is slidably disposed in the same bore 114 of the housing 112 above the lower piston 116A. In other words, the upper piston 132 is stacked above the lower piston 116A in the housing bore 114 in an axial direction, or with respect to the lower piston in a relatively exterior position. In this embodiment, the second or upper piston 132 has a second piston spring 127 disposed between the top surface 129 of the lower piston 116A and the upper piston 132 to bias the upper piston in a protruding direction. The upper piston 132 has a narrow waist or section of reduced diameter 116C which forms a cavity 124 for fluid between the housing bore 114 and the upper piston 132. A passageway 122 in the housing supplies high pressure fluid to the cavity 124.

The fluid chamber 130 is formed by the top surface 129 of the lower piston 116A and the interior of the hollow upper piston 132. Fluid passes into fluid chamber 130 through the fluid passage system which includes fluid passing from the passageway 122 in the housing through cavity 124 and through first and second openings 134A, 134B in the upper piston 132. The preferred embodiment does not have a check valve in the fluid passage system supplying pressurized fluid to chamber 130. It is thought that a check valve would prevent the cushioning effect of fluid being allowed to exit the fluid chamber 130 when the upper piston 132 is being forced back toward the housing. The openings 134A, 134B are holes formed on opposite sides of the piston 132. A single hole of a sufficient size or a plurality of holes may be used to permit fluid to enter and exit the chamber 130.

In operation of the tensioner, when the oil pressure becomes low as shown in FIG. 3, as when the engine is turned off or is idling, the lower piston 116A is biased upwardly by the first piston spring 126 and the lower piston tends naturally to the next ratchet setting. The upper piston 132 tends to settle against the top surface 129 of the lower piston 116A in response to tension from the chain.

When oil pressure is high as depicted in FIG. 4, the lower piston 116A is forced downwardly by the high pressure fluid in the fluid chamber 130 when the force due to oil pressure is great enough to overcome the first piston spring 126 load. Fluids and/or gases enter and escape from within the lower piston 116A by way of inlet 128. The rack 136 acts to prevent the lower piston 116A from being pushed downwardly the entire length of the bore when the pawl teeth 142 engage the grooves 120 on the side of the lower piston 116A. The same fluid pressure acts to force the upper piston 132 in a protruding direction from the bore of the housing 112 and against the tensioner arm 6, thus providing increased tension to the chain 8 (as shown in FIG. 5).

FIG. 5 shows the tensioner 110 of FIGS. 3 and 4 acting on a tensioner arm 6 to tension a portion of chain 8. The orientation of the lower piston 116A, the upper piston 132 and the pawl 136 are shown with regard to the housing 112 and the tensioner arm 6 and chain 8.During operation of the engine, the oil in the fluid chamber additionally provides a cushioning and damping effect between the upper piston 116A and the lower piston 132, and thus reduces the impact loads on the pawl 136 and resultant excessive wear.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A hydraulic chain tensioner comprising:

a housing having a housing bore;

a hollow first piston slidably received within said housing bore, said first piston forming a first chamber with said housing bore, said first piston having a rack formed along the outside, said first piston having a hollow upper end, said upper end of said first piston having a piston bore;

a piston spring located in said first chamber biasing said first piston in a protruding direction from said housing bore;

a ratchet mechanism disposed in a side of said housing, said ratchet mechanism having teeth for meshing with said rack;

a spring biasing said ratchet mechanism into engagement with said rack; and a hollow second piston disposed in said piston bore of said first piston, said second piston forming a second chamber in cooperation with said hollow upper end of said first piston, said second chamber being connected to a source of pressurized fluid by a fluid passage system including an inlet to said second chamber for filling said second chamber, said fluid passage system adapted to provide a reversible flow of said fluid through said inlet effective to dampen the movement of said second piston within said first piston bore when pressure is applied to said second piston.

2. The hydraulic chain tensioner of claim 1 wherein said rack includes a series of grooves formed along the outside of said first piston.

3. The hydraulic chain tensioner of claim 1 wherein said ratchet mechanism is a pawl disposed in a side bore of said housing.

4. The hydraulic chain tensioner of claim 1 wherein said fluid passage system includes:

a fluid passageway formed in said housing in communication with an external source of fluid pressure;

said first piston having a recessed area along the outside of said first piston, said recessed area defining a cavity with said housing bore, said cavity being in fluid communication with said fluid passageway; and an opening formed through said first piston, said opening being in fluid communication with said cavity and permitting fluid to enter and fill said second chamber from said cavity.

5. The hydraulic tensioner of claim 1 wherein a hollow portion of said second piston forms said second chamber in cooperation with said hollow upper end of said first piston.

6. A hydraulic chain tensioner comprising:

a housing having a housing bore;

a hollow first piston slidably received within said housing bore forming a first chamber therewith and having a rack formed along the outside of said first piston;

a first piston spring located in said first chamber biasing said first piston in a protruding direction from said housing bore;

a ratchet mechanism disposed in a side of said housing, said ratchet mechanism having teeth for meshing with said rack;

a spring biasing said ratchet mechanism into engagement with said rack; and a hollow second piston disposed in said housing bore and located in an exterior position with respect to said first piston, said second piston forming a second chamber in cooperation with a top surface of said first piston, said second chamber being connected to a source of pressurized fluid by a fluid passage system for filling and emptying said second chamber, said fluid passage system including an inlet to said second chamber for reversibly filling and emptying said second chamber.

7. The hydraulic chain tensioner of claim 6 wherein said rack includes a series of grooves formed along the outside of said first piston.

8. The hydraulic chain tensioner of claim 6 wherein said ratchet mechanism is a pawl disposed in a side bore of said housing.

9. The hydraulic chain tensioner of claim 6 wherein said fluid passage system includes:

a fluid passageway formed in said housing in communication with an external source of fluid pressure;

said second piston having a recessed area formed along the outside of said second piston, said recessed area defining a cavity with said housing bore, said cavity being in fluid communication with said fluid passageway; and an opening formed through said second piston, said opening being in fluid communication with said cavity, said opening permitting fluid to enter and fill said second chamber from said cavity.

10. The hydraulic tensioner of claim 9 wherein said second piston has a plurality of openings in fluid communication with said cavity, said openings permitting fluid to enter and fill said second chamber from said cavity.

11. The hydraulic tensioner of claim 6 wherein a hollow portion of said second piston forms said second chamber in cooperation with a top surface of said first piston.

12. The hydraulic tensioner of claim 6 wherein said fluid passage system adapted to provide a reversible flow of said fluid therethrough effective to dampen the movement of said second piston when pressure is applied to said second piston.

13. A hydraulic chain tensioner comprising:

a housing having a housing bore;

a first piston slidably received within said housing bore, said upper end of said first piston having a piston bore;

a second piston slidable relative to said first piston;

means for forming a first chamber with said first piston and said housing;

means for biasing said first piston in a protruding direction from said housing bore;

means for inhibiting the retraction of said first piston relative to said housing;

means for forming a second chamber with said first piston and said second piston; and means for connecting said second chamber to a source of pressurized fluid effective to dampen the retraction of said second piston relative to said housing by reversibly filling and emptying said second chamber through an inlet thereto.

* * * * *